US009062692B2

(12) United States Patent
Koiwai et al.

(10) Patent No.: US 9,062,692 B2
(45) Date of Patent: Jun. 23, 2015

(54) HYBRID CONSTRUCTION MACHINE

(75) Inventors: Kazushige Koiwai, Hiroshima (JP);
Mitsunori Hirozawa, Hiroshima (JP);
Yoichiro Yamazaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/110,169

(22) PCT Filed: Apr. 5, 2012

(86) PCT No.: PCT/JP2012/002387
§ 371 (c)(1),
(2), (4) Date: Oct. 7, 2013

(87) PCT Pub. No.: WO2012/137508
PCT Pub. Date: Oct. 11, 2012

(65) Prior Publication Data
US 2014/0026552 A1    Jan. 30, 2014

(30) Foreign Application Priority Data

Apr. 7, 2011  (JP) .................. 2011-085301

(51) Int. Cl.
*F15B 15/00*    (2006.01)
*B60K 6/40*    (2007.10)
(Continued)

(52) U.S. Cl.
CPC . *F15B 15/00* (2013.01); *B60K 6/40* (2013.01);
*Y02T 10/6282* (2013.01); *F15B 15/18*
(2013.01);
(Continued)

(58) Field of Classification Search
CPC .............. B60K 6/46; B60K 6/50; B60K 6/40;
B60K 6/405; B60K 6/30; B60K 6/26; B60K
6/20; B60K 6/105; B60W 10/08; B60W 10/30
USPC .............. 180/302, 305, 65.22, 65.27, 65.275,
180/65.245, 65.265, 65.285, 65.31; 477/3
See application file for complete search history.

(56) References Cited

U.S. PATENT DOCUMENTS 5,952,746 A * 9/1999 Mittmann et al. ......... 310/12.31
6,204,577 B1 * 3/2001 Chottiner et al. ............. 310/424
(Continued)

FOREIGN PATENT DOCUMENTS

CN    1935551 A    3/2007
JP    2002 238214    8/2002
(Continued)

OTHER PUBLICATIONS

International Search Report Issued Jul. 10, 2012 in PCT/JP12/002387 filed Apr. 5, 2012.

*Primary Examiner* — J. Allen Shriver, II
*Assistant Examiner* — Emma K Frick
(74) *Attorney, Agent, or Firm* — Oblon, McClelland, Maier & Neustadt, L.L.P.

(57) ABSTRACT

The axial lengths of coupling portions of a flywheel, a rotor shaft, and a pump shaft are reduced to reduce the axial length of an entire power unit. A crankshaft 4 and a flywheel 8 are directly coupled to each other and the flywheel 8 and a rotor shaft 5 are directly coupled to each other. A coupling 20 is directly coupled to an end face of the rotor shaft 5 on the opposite side to the flywheel 8. A pump shaft 6 is connected to the coupling 20. Coupling surfaces of the flywheel 8 and the rotor shaft 5 and coupling surfaces the rotor shaft 5 and the coupling 20 are arranged within a width range of a coil 19.

7 Claims, 2 Drawing Sheets

(51) Int. Cl.
  *F15B 15/18* (2006.01)
  *B60K 6/387* (2007.10)
  *B60K 6/485* (2007.10)
  *E02F 9/20* (2006.01)
  *H02K 7/00* (2006.01)
  *B60K 6/26* (2007.10)

(52) U.S. Cl.
  CPC . *B60K 6/26* (2013.01); *B60K 6/387* (2013.01); *B60K 6/485* (2013.01); *E02F 9/202* (2013.01); *H02K 7/00* (2013.01); *Y02T 10/6226* (2013.01)

(56) References Cited

U.S. PATENT DOCUMENTS

| | | | |
|---|---|---|---|
| 6,340,339 B1 * | 1/2002 | Tabata et al. | 475/5 |
| 6,668,953 B1 * | 12/2003 | Reik et al. | 180/53.8 |
| 6,720,696 B2 * | 4/2004 | Berhan | 310/113 |
| 7,992,661 B2 * | 8/2011 | Nomura et al. | 180/65.21 |
| 8,084,908 B2 * | 12/2011 | Chiba | 310/102 R |
| 8,232,697 B2 * | 7/2012 | Chiba et al. | 310/75 D |
| 8,556,010 B2 * | 10/2013 | Ebert et al. | 180/65.25 |
| 8,569,919 B2 * | 10/2013 | Sugimoto et al. | 310/90 |
| 8,657,094 B2 * | 2/2014 | Kawashima et al. | 192/85.25 |
| 8,659,192 B2 * | 2/2014 | Isogai et al. | 310/54 |
| 8,770,364 B2 * | 7/2014 | Frait et al. | 192/3.33 |
| 8,829,743 B2 * | 9/2014 | Watanabe et al. | 310/54 |
| 8,836,180 B2 * | 9/2014 | Satou et al. | 310/61 |
| 2005/0045135 A1 | 3/2005 | Taylor et al. | |
| 2006/0289209 A1 * | 12/2006 | Grosspietsch et al. | 180/65.2 |
| 2012/0242199 A1 * | 9/2012 | Iwase et al. | 310/68 B |
| 2013/0133962 A1 * | 5/2013 | Watanabe et al. | 180/65.26 |

FOREIGN PATENT DOCUMENTS

| | | |
|---|---|---|
| JP | 2008 7023 | 1/2008 |
| JP | 2008 290594 | 12/2008 |

* cited by examiner

HYBRID CONSTRUCTION MACHINE

TECHNICAL FIELD

The present invention relates to hybrid construction machine including a generator motor and a hydraulic pump that are connected to an engine.

BACKGROUND ART

A background art is explained with reference to a shovel as an example.

A hybrid shovel includes an engine, and a generator motor and a hydraulic pump that are connected to the engine. The hydraulic pump drives a hydraulic actuator by discharged oil of the hydraulic pump. On the other hand, the generator motor operates as a generator by the power of the engine to thereby charge an electric storage device and timely operates as a motor by the electric power of the electric storage device to thereby assist the engine.

In the hybrid shovel, a connection (power transmission) structure of the engine, the generator motor, and the hydraulic pump that configure a power unit is disclosed in, for example, Patent Document 1.

The structure described in Patent Document 1 includes a flywheel attached to a crankshaft of the engine. The flywheel is directly coupled to a rotor shaft of the generator motor by bolts. The rotor shaft is supported by a bearing provided in a motor housing of the generator motor. Consequently, the flywheel and the rotor shaft are supported in two places, i.e., a supporting portion by the bearing of the crankshaft and a supporting portion by the bearing of the rotor shaft. In this state, the rotor shaft and a pump shaft are spline-coupled.

However, when the rotor shaft is independently supported by the bearing as described in Patent Document 1, the rotor shaft needs to be increased in length by the length of the supporting portion by the bearing. Therefore, the lengths of coupling portions of the flywheel, the rotor shaft (a rotor), and the pump shaft increase, and therefore the axial length of the entire power unit increases.

Therefore, the configuration described in Patent Document 1 is disadvantageous, in particular, in a shovel in which a space (an engine room) for disposing a power unit is limited.

Note that, in the structure described in Patent Document 1, in order to reduce the axial length, it is conceivable to omit the bearing that independently supports the rotor shaft. That is, it is conceivable to change the structure into a structure in which the flywheel and the rotor shaft are supported in a cantilevered manner only in the supporting portion by the bearing of the crankshaft.

However, the axial length is reduced only a little by simply omitting the bearing, which supports the rotor shaft, without changing the structure described in Patent Document 1. Therefore, when the structure described in Patent Document 1 is changed to a structure in which the flywheel and the crankshaft are supported in a cantilevered manner, a bending moment applied to the crankshaft becomes excessive. Consequently, insufficiency of strength of the crankshaft and the like is caused or an adverse effect that the strength of the crankshaft and the like has to be substantially increased occurs.

Patent Document 1: Japanese Unexamined Patent Publication No. 2008-7023

SUMMARY OF THE INVENTION

An object of the present invention is to provide hybrid construction machine that can realize a cantilevered supporting structure and attain a reduction in the axial length of an entire power unit by reducing the axial lengths of coupling portions of a flywheel, a rotor shaft, and a pump shaft to reduce a bending moment applied to a crankshaft.

In order to solve the problems, the present invention provides hybrid construction machine including: an engine including a crankshaft; a hydraulic pump connected to the engine and configured to drive a hydraulic actuator; a generator motor connected to the engine and configured to operate as a generator by the power of the engine to thereby charge an electric storage device and operate as a motor by the electric power of the electric storage device to thereby assist the engine; a flywheel attached to the crankshaft; and a coupling connecting a pump shaft included in the hydraulic pump to a rotor shaft included in the generator motor, wherein the generator motor includes: a rotor configured to rotate about the rotor shaft; and a stator having a coil arranged in the outer circumference of the rotor, and (i) the crankshaft and the flywheel are directly coupled to each other, and the flywheel and the rotor shaft are directly coupled to each other, (ii) the coupling is directly coupled to an end face of the rotor shaft on the opposite side to the flywheel, and the pump shaft is connected to the coupling, and (iii) coupling surfaces of the flywheel and the rotor shaft, and coupling surfaces of the rotor shaft and the coupling are arranged within a width range of the coil.

According to the present invention, it is possible to realize a cantilevered supporting structure and attain a reduction in the axial length of an entire power unit by reducing the axial lengths of coupling portions of the flywheel, the rotor shaft, and the pump shaft to reduce a bending moment applied to the crankshaft.

BEST MODE FOR CARRYING OUT THE INVENTION

Hereinafter, an embodiment of the present invention will be explained with reference to the attached drawings. The embodiment described below is each an example embodying the present invention and is not intended to limit the technical scope of the present invention.

Figure 1:
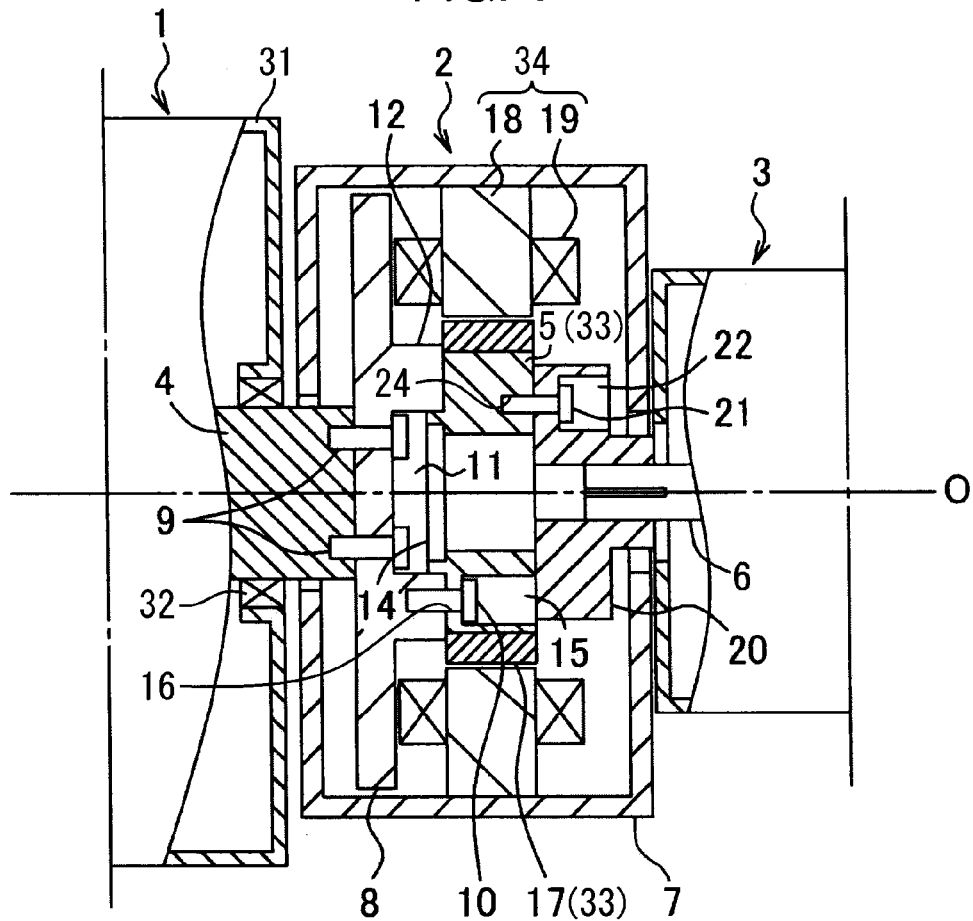
FIG. 1 is a sectional view showing a coupling structure of a flywheel, a rotor shaft, and a pump shaft according to an embodiment of the present invention.

Referring to FIG. 1, hybrid construction machine includes an engine 1, a generator motor 2 and a hydraulic pump 3 each connected to the engine 1, a flywheel 8, and a coupling 20.

The engine 1 includes an engine housing 31 for housing main components (not shown in the figure) of the engine 1, a crankshaft 4 functioning as an output shaft that penetrates the engine housing 31 and extends to the outer side of the engine housing 31, and a bearing supporting portion 32 configured to rotatably support the crankshaft 4 with respect to the engine housing 31.

The generator motor 2 operates as a generator by the power of the engine 1 to thereby charge a electric storage device (not shown in the figure) and operates as a motor by the electric power of the electric storage device to thereby assist the engine 1. Specifically, the generator motor 2 includes a rotor 33, a stator 34 arranged in the outer circumference of the rotor 33, and a motor housing 7 for housing the rotor 33 and the stator 34. The rotor 33 includes a rotor shaft 5 and a rotor core 17 provided in the outer circumference of the rotor shaft 5. The rotor 33 rotates about the rotor shaft 5. On a coupling surface of the rotor shaft 5 with respect to the flywheel 8, a protrusion 14 projecting to the flywheel 8 side is integrally provided. The protrusion 14 has a ring-like shape centering on a rotation center O of the rotor shaft 5 (synonymous with the rotation center of the flywheel 8 and the rotation center of the pump shaft; hereinafter referred to as shaft rotation center). The stator 34 includes a stator core 18 and a coil 19 wound around the stator core 18.

The hydraulic pump 3 drives a not-shown hydraulic actuator with discharged oil of the hydraulic pump 3. Specifically, the hydraulic pump 3 includes a pump shaft 6 connected to the rotor shaft 5.

The flywheel 8 is connected to both of the crankshaft 4 and the rotor shaft 5 between the crankshaft 4 and the rotor shaft 5. Specifically, on a coupling surface of the flywheel 8 with respect to the rotor shaft 5, a short cylindrical section 12 projecting to the rotor shaft 5 side is integrally provided. An inner circumferential side of the short cylindrical section 12 configures a recess 11. The recess 11 is formed in a circular shape centering on the shaft rotation center O on the coupling surface of the flywheel 8 with respect to the rotor shaft 5. The recess 11 is set to size in which the protrusion 14 of the rotor shaft 5 can be fit. The short cylindrical section 12 surrounding the recess 11 configures a circumferential wall according to this embodiment.

The coupling 20 is connected to both of the rotor shaft 5 and the pump shaft 6 between the rotor shaft 5 and the pump shaft 6.

As explained above, the rotor shaft 5 of the generator motor 2 is connected to the crankshaft 4 served as the output shaft of the engine 1. The pump shaft 6 of the hydraulic pump 3 is connected to the rotor shaft 5.

Specific structures of coupling sections are explained below with reference to FIGS. 1 to 3.

(A) Coupling Section of the Crankshaft 4 and the Rotor Shaft 5

An end of the crankshaft 4 is led into the motor housing 7. The flywheel 8 is directly coupled to an end face of the crankshaft 4 in the motor housing 7. Specifically, the end face of the crankshaft 4 and the flywheel 8 are fixed by flywheel attachment bolts 9 in a plurality of places in the circumferential direction centering on the shaft rotation center O. Further, the rotor shaft 5 is directly coupled to the flywheel 8. Specifically, the flywheel 8 and the rotor shaft 5 are fixed by a plurality of first bolts 10 in a plurality of places in the circumferential direction centering on the shaft rotation center O.

Figure 2:
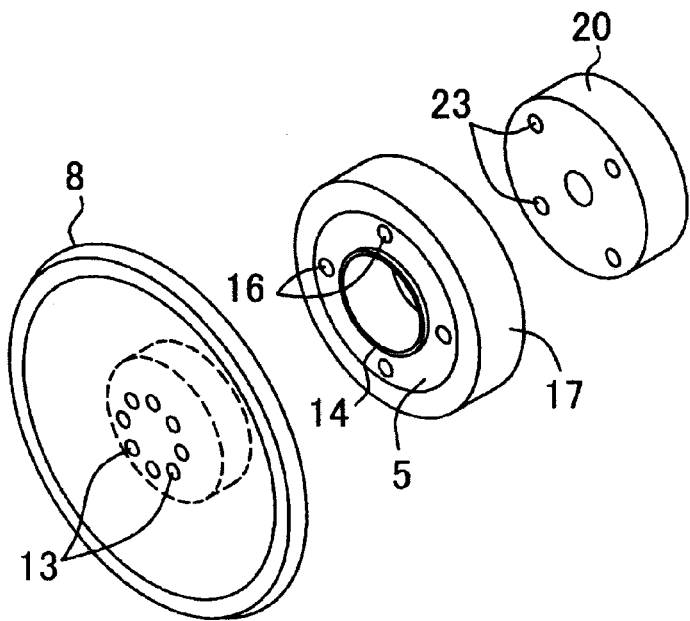
FIG. 2 is a disassembled perspective view of the flywheel, the rotor, and the coupling shown in FIG. 1.
Figure 3:
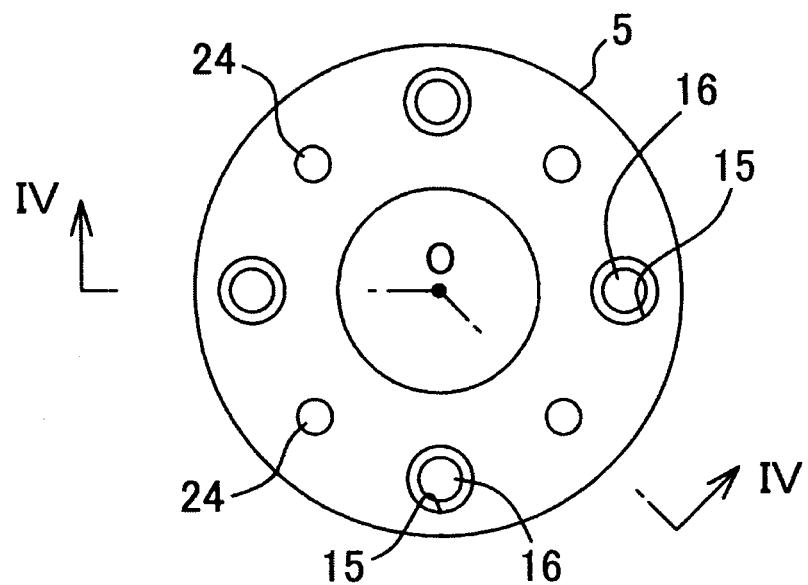
FIG. 3 is a rear view of the rotor shaft shown in FIG. 2.

Note that, in FIGS. 1 to 3, the shapes of the flywheel 8 and the rotor shaft 5 are simplified.

(A-1) Coupling Structure of the Crankshaft 4 and the Flywheel 8

The flywheel attachment bolts 9 penetrate the bottom wall of the recess 11 formed in the flywheel 8 and are screwed into the end face (screw holes) of the crankshaft 4. In FIG. 2, reference numeral 13 denotes bolt through-holes through which the flywheel attachment bolts 9 are inserted.

(A-2) Coupling Structure of the Flywheel 8 and the Rotor Shaft 5

The rotor shaft 5 is directly coupled to the coupling surface (an end face on the short cylindrical section 12 side) of the flywheel 8 with respect to the rotor shaft 5 by the first bolts 10 in a state that the protrusion 14 of the rotor shaft 5 is fit in the recess 11 of the flywheel 8.

The first bolts 10 penetrate the rotor shaft 5 in a direction parallel to the shaft rotation center O and are screwed into the flywheel 8. Specifically, in a plurality of places in the circumferential direction of the shaft rotation center O in the rotor shaft 5, first bolt housing holes 15 (see FIGS. 1, 3, and 4) and bolt through-holes 16 (see FIGS. 1 to 4) are concentrically provided. The first bolt housing holes 15 are bottomed holes formed in a range extending from an end face of the rotor shaft 5 on the coupling 20 side but not reaching the opposite end face. The bolt through-holes 16 are formed in the bottom walls of the first bolt housing holes 15. In a state that the heads of the first bolts 10 are housed in the first bolt housing holes 15, thread sections of the first bolts 10 penetrate the bottom walls of the first bolt housing holes 15 and are screwed into the flywheel 8. In this embodiment, the first bolt housing holes 15 and the bolt through-holes 16 are arranged such that at least a part of the first bolts 10 are arranged in a range covered with the coupling 20.

(B) Coupling Section of the Rotor Shaft 5 and the Pump Shaft 6

A surface (a coupling surface with respect to the coupling 20) of the rotor shaft 5 on the opposite side to the flywheel 8 is directly coupled to the coupling 20. Specifically, the rotor shaft 5 and the flywheel 8 are fixed by a plurality of second bolts 21 in a plurality of places in the circumferential direction centering on the shaft rotation center O. An end portion of the coupling 20 on the opposite side to the rotor shaft 5 is spline-coupled to the pump shaft 6.

Figure 4:
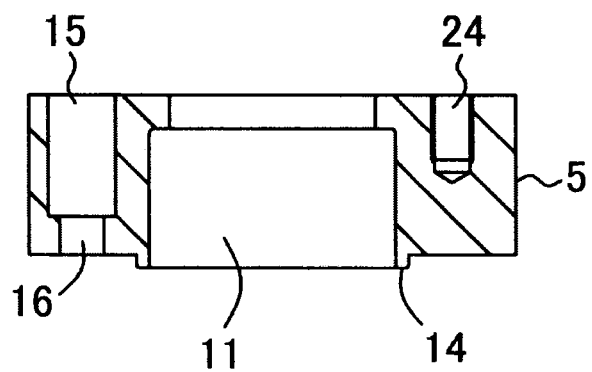
FIG. 4 is a sectional view taken along line IV-IV in FIG. 3.

The second bolts 21 penetrate the coupling 20 in the direction parallel to the shaft rotation center O and are screwed into the rotor shaft 5. Specifically, second bolt housing holes 22 and both through-holes 23 are concentrically provided in a plurality of places in the circumferential direction of the shaft rotation center O in the coupling 20. The second bolt housing holes 22 are bottomed holes formed in a range extending from an end face of the coupling 20 on the hydraulic pump 3 side but not reaching the opposite end face. The bolt through-holes 23 are formed in the bottom walls of the second bolt housing holes 22. As shown in FIGS. 1, 3, and 4, on an attachment surface of the rotor shaft 5 with respect to the coupling 20, screw holes 24 are formed in positions corresponding to the bolt through-holes 23. In a state that the heads of the second bolts 21 are housed in the second bolt housing holes 22, thread sections of the second bolts 21 penetrate the bottom walls of the second bolt housing holes 22 and are screwed into the screw holes 24 of the rotor shaft 5. Consequently, it is possible to prevent the heads of the second bolts 21 from projecting to the outer side of the coupling 20.

In this embodiment, the coupling surfaces of the flywheel 8 and the rotor shaft 5 and the coupling surfaces of the rotor shaft 5 and the coupling 20 are arranged within a width range of the coil 19 of the stator 34 in the generator motor 2.

In other words, the flywheel 8 and the rotor shaft 5 are coupled to each other by bolts and the rotor shaft 5 and the coupling 20 are coupled to each other by bolts in a state that the coupling surfaces thereof are located within the width range of the coil 19.

Note that the width range of the coil 19 means a width range of the coil 19 in the direction parallel to the shaft rotation center O.

As shown in FIGS. 3 and 4, the bolt through-holes 16 and the screw holes 24 of the rotor shaft 5 are respectively provided in a plurality of places on the circumference centering on the shaft rotation center O while being positionally shifted from each other in the circumferential direction.

That is, the first bolts 10 that couple the flywheel 8 and the rotor shaft 5 and the second bolts 21 that couple the rotor shaft 5 and the coupling 20 are arranged while being positionally shifted from each other in the circumferential direction.

Note that the bolts 10 and 21 may be arranged on the same circumference or may be provided on separate circumferences having slightly different diameters.

As explained above, in the embodiment, the flywheel 8 and the rotor shaft 5 (the rotor) are directly coupled to each other and the pump shaft 6 is spline-coupled to the rotor shaft 5. That is, a "cantilevered supporting structure" in which the flywheel 8, the rotor shaft 5, and the pump shaft 6 are supported by only the bearing supporting portion 32 of the crankshaft 4 in the engine housing 31 is adopted.

However, In the case where the cantilevered supporting structure is simply adopted, the total length of coupling portions of the flywheel 8, the rotor shaft 5, and the pump shaft 6 is large and a bending moment applied to the crankshaft 4 increases. Therefore, in the case where the crankshaft 4 is supported in a cantilevered manner only by the bearing supporting portion 32, the crankshaft 4 has insufficient strength.

Therefore, in the embodiment explained above, a structure in which the coupling surfaces of the flywheel 8 and the rotor shaft 5 and the coupling surfaces of the rotor shaft 5 and the coupling 20 are arranged within the width range of the coil 19 (the flywheel 8, the rotor shaft 5, and the coupling 20 are coupled together within the coil width range) is adopted. Consequently, it is possible to reduce the total axial length of the coupling portions of the flywheel 8, the rotor shaft 5, and the pump shaft 6 and reduce a bending load applied to the crankshaft 4.

In other words, it is possible to support the flywheel 8, the rotor shaft 5, and the pump shaft 6 in a cantilevered manner without increasing the strength of the crankshaft 4.

Consequently, it is possible to reduce the axial length of the power unit including the engine 1, the generator motor 2, and the hydraulic pump 3 and easily set the power unit in a limited space (an engine room).

Further, according to the embodiment, effects explained below can be obtained.

(I) In a state where the recess 11 and the ring-like protrusion 14 are fit with each other, the flywheel 8 and the rotor shaft 5 are coupled to each other by the first bolts 10. Therefore, it is possible to improve assemblability while securing concentricity of the flywheel 8 and the rotor shaft 5.

In this case, the heads of the flywheel attachment bolts 9 are housed in the recess 11 for the fitting. Consequently, the heads of the flywheel attachment bolts 9 do not project to the outer side of the flywheel 8. Therefore, it is possible to further reduce the axial length of the power unit.

(II) In case where the flywheel 8 and the rotor shaft 5 are coupled to each other by the first bolts 10 and the rotor shaft 5 and the coupling 20 are coupled to each other by the second bolts 21, it is likely that the first bolts 10 and the second bolts 21 interfere with each other.

As a method of avoiding the interference, it is conceivable to set the dimension in the axial direction of the rotor shaft 5 larger than the total length of the bolts 10 and 21. However, then, the axial lengths of the coupling portions of the flywheel 8, the rotor shaft, and the coupling 20 increase.

In case where the positions of the bolts 10 and 21 are greatly shifted in the diameter direction, the diameter dimension of the rotor shaft 5 or the coupling 20 has to be increased.

In this respect, in the embodiment, the first bolts 10 and the second bolts 21 are arranged such that the first bolts 10 and the second bolts 21 are positionally shifted from each other in the circumferential direction. Therefore, it is possible to prevent the interference of the bolts 10 and 21 while minimizing the axial lengths and the diameters of the rotor shaft 5 and the coupling 20.

In the embodiment, at least a part of the first bolts 10 are arranged in the range covered with the coupling 20. In other words, the first bolts 10 and the second bolts 21 are arranged such that the first bolts 10 and the second bolts 21 are positionally shifted from each other in the circumferential direction within the range in the diameter direction of the coupling 20. Consequently, it is possible to more effectively reduce the size in the diameter direction of the rotor shaft 5 for arranging the first bolts 10 to avoid the interference with the second bolts 21.

In the embodiment, the heads of the first bolts 10 are housed in the first bolt housing holes 15. Consequently, it is possible to prevent the first bolts 10 from projecting from the rotor shaft 5 in the axial direction of the rotor shaft 5. Therefore, it is possible to prevent interference of the coupling 20, which is arranged to cover at least a part of the first bolts 10, and the heads of the first bolts 10. Therefore, according to the embodiment, it is possible to further reduce not only the size in the diameter direction of the rotor shaft 5 but also the size in the axial direction of the entire power unit.

In the embodiment, in the state that the heads of the second bolts 21 are housed in the second bolt housing holes 22, the rotor shaft 5 and the coupling 20 can be coupled by the second bolts 21. Consequently, it is possible to prevent the second bolts 21 from projecting from the coupling 20 in the axial direction of the rotor shaft 5. Therefore, it is possible to further reduce the size of the entire power unit in the axial direction.

According to the embodiment, the short cylindrical section (the circumferential wall) of the flywheel 8 defining the recess 11 for fitting the protrusion 14 of the rotor shaft 5 can be used as a portion into which the first bolts 10 are screwed. Therefore, it is possible to sufficiently check screwing depth of the first bolts 10 using the short cylindrical section thicker than the bottom wall of the recess 11 while avoiding the interference of the flywheel attachment bolts 9 and the first bolts 10.

Incidentally, the present invention is not limited to the hybrid shovel and can be widely applied to hybrid construction machine in which an engine, a generator motor, and a hydraulic pump are connected on the same axis.

Note that an invention including a configuration explained below is mainly included in the specific embodiment explained above.

In order to solve the problems, the present invention provides hybrid construction machine including: an engine including a crankshaft; a hydraulic pump connected to the engine and configured to drive a hydraulic actuator; a generator motor connected to the engine and configured to operate as a generator by the power of the engine to thereby charge an electric storage device and operate as a motor by the electric power of the electric storage device to thereby assist the engine; a flywheel attached to the crankshaft; and a coupling connecting a pump shaft included in the hydraulic pump to a rotor shaft included in the generator motor, wherein the generator motor includes: a rotor configured to rotate about the rotor shaft; and a stator having a coil arranged in the outer circumference of the rotor, and (i) the crankshaft and the flywheel are directly coupled to each other, and the flywheel and the rotor shaft are directly coupled to each other, (ii) the coupling is directly coupled to an end face of the rotor shaft on the opposite side to the flywheel, and the pump shaft is connected to the coupling, and (iii) coupling surfaces of the flywheel and the rotor shaft, and coupling surfaces of the rotor shaft and the coupling are arranged within a width range of the coil.

In this way, in the present invention, on the premise of the configuration (i) in which the flywheel and the rotor shaft are directly coupled to each other, the configuration (ii) in which the rotor shaft and the pump shaft are connected to each other via the coupling is adopted.

However, only with the configurations (i) and (ii), the total length of the coupling portions of the flywheel, the rotor shaft, and the pump shaft is long and a bending moment applied to the crankshaft increases. Therefore, In case where the crankshaft is supported in a cantilevered manner only by the supporting portion by the bearing, the crankshaft has insufficient strength.

Therefore, in the present invention, the configuration (iii) in which the coupling surfaces of the flywheel and the rotor shaft, and the coupling surfaces of the rotor shaft and the coupling are arranged within the width range of the coil is adopted. Consequently, it is possible to reduce the bending moment applied to the crankshaft by minimizing the total axial length of the coupling portions of the flywheel, the rotor shaft, and the pump shaft. Therefore, according to the present invention, it is possible to realize a cantilevered supporting structure and attain a reduction in the axial length of the entire power unit.

Note that the 'width range of the coil' in the configuration (iii) means a width range of the coil in the axial direction of the rotor shaft.

It is preferable that, in the hybrid construction machine, a circular recess centering on the rotation center of the rotor shaft is provided on the coupling surface of the flywheel with respect to the rotor shaft, a ring-like protrusion centering on the rotation center of the rotor shaft is provided on the coupling surface of the rotor shaft with respect to the flywheel, the hybrid construction machine further includes flywheel attachment bolts that penetrates the bottom wall of the recess and are screwed into the end face of the crankshaft to thereby couple the flywheel to the crankshaft, and the flywheel and the rotor shaft are coupled to each other in a state that the protrusion is fit in the recess.

According to this aspect, it is possible to attain both of securing of concentricity of the flywheel and the rotor shaft and improvement of assemblability by fitting the recess and the protrusion. Moreover, it is possible to further reduce the axial length of the coupling portion by coupling the flywheel and the rotor shaft using the flywheel attachment bolts that penetrates through the bottom wall of the recess for the fitting.

Incidentally, it is assumed that the flywheel and the rotor shaft are coupled to each other by the first bolts and the rotor shaft and the coupling are coupled to each other by the second bolts. In this case, as a method of avoiding interference of the first bolts and the second bolts, it is conceivable to set the dimension in the axial direction of the rotor shaft larger than the total length of both of the bolts. However, then, the axial lengths of the coupling portions of the flywheel, the rotor shaft, and the coupling increase.

In the case where the positions of the respective bolts are greatly shifted from each other in the diameter direction in order to avoid the interference between the respective bolts, the diameter dimension of the rotor shaft or the coupling has to be increased.

Therefore, it is preferable that the hybrid construction machine further includes a plurality of first bolts that couple the flywheel to the rotor shaft in a plurality of places on the circumference centering on the rotation center of the rotor shaft and a plurality of second bolts that couple the rotor shaft to the coupling in a plurality of places on the circumference centering on the rotation center of the rotor shaft, and the first bolts and the second bolts are arranged such that the first bolts and the second bolts are positionally shifted from each other in the circumferential direction.

According to this aspect, it is possible to avoid interference between the respective bolts while minimizing the axial lengths and the diameters of the rotor shaft and the coupling.

It is preferable that, in the hybrid construction machine, the first bolts penetrate the rotor shaft in the axial direction thereof and are screwed into the flywheel, the second bolts penetrate the coupling in the axial direction of the rotor shaft and are screwed into the rotor shaft, and at least a part of the first bolts are arranged within a range covered by the coupling.

In this aspect, at least a part of the first bolts are arranged in the range covered by the coupling. That is, the first bolts and the second bolts are arranged such that the first bolts and the second bolts are positionally shifted from each other in the circumferential direction within the range in the diameter direction of the coupling. Consequently, it is possible to more effectively suppress the size in the diameter direction of the rotor shaft for arranging the first bolts to avoid the interference with the second bolts.

It is preferable that, in the hybrid construction machine, first bolt housing holes that can house the heads of the first bolts are formed in the rotor shaft.

According to this aspect, it is possible to further reduce not only the size in the diameter direction of the rotor shaft but also the size in the shaft direction of the entire power unit. Specifically, in the aspect, the heads of the first bolts are housed in the first bolt housing holes. Consequently, it is possible to prevent the first bolts from projecting from the rotor shaft in the axial direction of the rotor shaft. Therefore, it is possible to prevent interference of the coupling, which is arranged to cover at least a part of the first bolts, and the heads of the first bolts.

It is preferable that, in the hybrid construction machine, second bolt housing holes that can house the heads of the second bolts are formed in the coupling.

In this aspect, in a state that the heads of the second bolts are housed in the second bolt housing holes, the rotor shaft and the coupling can be coupled by the second bolts. Consequently, it is possible to prevent the second bolts from projecting from the coupling in the axial direction of the rotor shaft. Therefore, it is possible to further reduce the size of the entire power unit in the axial direction.

It is preferable that, in the hybrid construction machine, the hybrid construction machine further includes first bolts that penetrate the rotor shaft in the axial direction thereof and are screwed into the flywheel to thereby couple the rotor shaft to the flywheel, and the first bolts are screwed into a circumferential wall surrounding the recess of the flywheel.

According to this aspect, the circumferential wall of the flywheel defining the recess for fitting the protrusion of the rotor shaft can be used as a portion into which the first bolts are screwed. Therefore, it is possible to sufficiently secure screwing depth of the first bolts using the circumferential wall thicker than the bottom wall of the recess while avoiding interference of the flywheel attachment bolts and the first bolts.

INDUSTRIAL APPLICABILITY

According to the present invention, it is possible to realize a cantilevered supporting structure and attain a reduction in the axial length of the entire power unit by reducing the axial lengths of the coupling portions of the flywheel, the rotor shaft, and the pump shaft and reducing a bending moment applied to the crankshaft.

EXPLANATION OF REFERENCE NUMERALS

O Shaft rotation center (a rotation center of a rotor shaft)
1 Engine
2 Generator motor
3 Hydraulic pump
4 Crankshaft
5 Rotor shaft
6 Pump shaft
8 Flywheel
9 Flywheel attachment bolts
10 First bolts
11 Recess
12 Short cylindrical section (circumferential wall)
14 Protrusion
15 First bolt housing holes
19 Coil
20 Coupling
21 Second bolts
22 Second bolt housing holes
32 Bearing supporting portion
33 Rotor
34 Stator

The invention claimed is:

1. A hybrid construction machine comprising:
an engine including a crankshaft;
a hydraulic pump connected to the engine and configured to drive a hydraulic actuator;
a generator motor connected to the engine and configured to operate as a generator by power of the engine to thereby charge an electric storage device and operate as a motor by electric power of the electric storage device to thereby assist the engine;
a flywheel attached to the crankshaft; and
a coupling connecting a pump shaft included in the hydraulic pump to a rotor shaft included in the generator motor, wherein the generator motor includes:
a rotor configured to rotate about the rotor shaft; and
a stator having a coil arranged in an outer circumference of the rotor, and
(i) the crankshaft and the flywheel are directly coupled to each other, and the flywheel and the rotor shaft are directly coupled to each other, defining first coupling surfaces of the flywheel and the rotor shaft,
(ii) the coupling is directly coupled to an end face of the rotor shaft on an opposite side to the flywheel, defining second coupling surfaces of the coupling and the rotor shaft, and the pump shaft is connected to the coupling, and
(iii) the first coupling surfaces and the second coupling surfaces are arranged within a width range of the coil.

2. The hybrid construction machine according to claim 1, wherein
a circular recess centering on a rotation center of the rotor shaft is provided on the first coupling surface of the flywheel,
a ring-like protrusion centering on the rotation center of the rotor shaft is provided on the first coupling surface of the rotor shaft,
the hybrid construction machine further comprises flywheel attachment bolts that penetrates a bottom wall of the recess and are screwed into an end face of the crankshaft to thereby couple the flywheel to the crankshaft, and
the flywheel and the rotor shaft are coupled to each other in a state that the protrusion is fit in the recess.

3. The hybrid construction machine according to claim 2, further comprising first bolts that penetrate the rotor shaft in an axial direction thereof and are screwed into the flywheel to thereby couple the rotor shaft to the flywheel, wherein
the first bolts are screwed into a circumferential wall surrounding the recess of the flywheel.

4. The hybrid construction machine according to claim 1, further comprising:
a plurality of first bolts that couple the flywheel to the rotor shaft in a plurality of places on a circumference centering on a rotation center of the rotor shaft; and
a plurality of second bolts that couple the rotor shaft to the coupling in a plurality of places on a circumference centering on the rotation center of the rotor shaft, wherein
the first bolts and the second bolts are arranged such that the first bolts and the second bolts are positionally shifted from each other in a circumferential direction.

5. The hybrid construction machine according to claim 4, wherein
the first bolts penetrate the rotor shaft in an axial direction thereof and are screwed into the flywheel,
the second bolts penetrate the coupling in the axial direction of the rotor shaft and are screwed into the rotor shaft, and
at least a part of the first bolts are arranged within a range covered by the coupling.

6. The hybrid construction machine according to claim 5, wherein first bolt housing holes that can house heads of the first bolts are formed in the rotor shaft.

7. The hybrid construction machine according to claim 5, wherein second bolt housing holes that can house heads of the second bolts are formed in the coupling.

* * * * *